(12) United States Patent
Buker et al.

(10) Patent No.: US 6,447,044 B1
(45) Date of Patent: Sep. 10, 2002

(54) SHELTERED AIRCRAFT SUPPLY VEHICLE

(75) Inventors: Bob Buker, Gilze (NL); Michael Cramaro, Indian Harbor Beach, FL (US)

(73) Assignee: Cramaro Tarpaulin Systems, Inc., Newark, DE (US)

( * ) Notice: Subject to any disclaimer, the term of this patent is extended or adjusted under 35 U.S.C. 154(b) by 0 days.

(21) Appl. No.: 09/797,364

(22) Filed: Mar. 1, 2001

(51) Int. Cl.[7] .............................. B60P 1/02; B60P 1/00; B60P 7/02
(52) U.S. Cl. ................. 296/99.1; 296/183; 296/100.03; 414/495
(58) Field of Search ................. 296/99.1, 183; 414/495; 182/127; 276/100.03, 100.04, 100.05

(56) References Cited

U.S. PATENT DOCUMENTS

| 1,728,006 | A | * | 9/1929 | Parry, Jr. et al. ............ 296/99.1 |
| 3,090,514 | A | * | 5/1963 | Black, Sr. et al. ........... 414/495 |
| 3,126,112 | A | * | 3/1964 | Shaw et al. .................. 414/495 |
| 3,169,792 | A | * | 2/1965 | Solano Viquez ........... 296/99.1 |
| 3,524,563 | A | * | 8/1970 | McCartney et al. ......... 414/495 |
| 3,537,745 | A | * | 11/1970 | Herring, Jr. .................. 414/495 |
| 3,658,377 | A | * | 4/1972 | Behrmann ................... 414/495 |
| 3,687,321 | A | * | 8/1972 | Goodhart et al. ............ 414/495 |
| 4,886,411 | A | * | 12/1989 | Pieperhoff et al. .......... 296/99.1 |
| 5,848,870 | A | * | 12/1998 | Smith et al. ................. 414/495 |

FOREIGN PATENT DOCUMENTS

| DE | 3523496 | * | 1/1987 | .................. 414/495 |
| DE | 3545408 | * | 6/1987 | .................. 414/495 |
| EP | 0136970 | * | 4/1985 | .................. 414/495 |
| JP | 55-31682 | * | 3/1980 | .................. 296/99.1 |
| JP | 4-176730 | * | 6/1992 | .................. 296/183 |

* cited by examiner

*Primary Examiner*—Joseph D. Pape
*Assistant Examiner*—H. Gutman
(74) *Attorney, Agent, or Firm*—Connolly Bove Lodge & Hutz (57) ABSTRACT

A sheltered aircraft supply vehicle includes an entrance station located above the cab of the vehicle. The vehicle body is elevatable. A cover system is mounted to the vehicle body and is extended outwardly above the entrance station when the body is elevated. The cover system includes a roof section disposed over the entrance station and includes downwardly depending wings which contact side walls of the entrance station to create a closed tunnel between the vehicle body and an aircraft.

20 Claims, 6 Drawing Sheets

SHELTERED AIRCRAFT SUPPLY VEHICLE

BACKGROUND OF THE INVENTION

Vehicles, particularly trucks, are used for providing supplies to aircrafts. For example, a catering truck would be used which would drive to a location adjacent to an aircraft. Meals or other supplies would be removed from the truck and carried into the aircraft.

It would be desirable if such a vehicle could include a cover system to shelter a worker as the worker moves back and forth to and from the vehicle and aircraft. It would also be desirable if a cover system could be provided to protect the inside of the plane, particularly in the area of the aircraft door or hatch so that when the door is opened the interior of the aircraft near the door including seats would be protected. It would also be desirable if a cover system could be provided to maintain the temperature conditions within an aircraft when the aircraft door or hatch is open to minimize the escape of heat or air conditioned cold air from the aircraft.

SUMMARY OF THE INVENTION

An object of this invention is to provide a sheltered aircraft vehicle which includes a cover system to fulfill the above desires.

A further object of this invention is to provide such a vehicle wherein the cover system could be easily moved to and from its retracted and extended covering conditions.

In accordance with this invention, a conventional vehicle, such as a catering truck is provided with a cover system. The vehicle would have a body mounted in back of a cab. The body would be elevatable to a height generally in line with the location of the aircraft door or hatch. When the vehicle is traveling, the body would be in its normal lowered condition. An entrance station is provided over the cab forwardly of the body to provide a walkway between the vehicle body and the aircraft door. The entrance station could be provided with generally permanent side walls that extend to the height of the body when the body is in its lowered condition. Upon elevating the body a cover system would be employed to complete the sheltering of the entrance station. (Alternatively, the roof section could be permanently mounted over the cab.) The cover system preferably includes a roof section and depending wings which are mounted against each other in the retracted condition of the cover system. When the vehicle body is elevated the cover system would be pulled forwardly so as to be disposed over the cab and entrance station. The wings would then extend downwardly toward the entrance station side walls to create the shelter or tunnel effect.

In a preferred practice of the invention one of the side walls includes a gate that is openable so that the entrance station could be entered externally of the truck in the area of the cab such as by means of a ladder leading to the gate.

DETAILED DESCRIPTION

The present invention in its preferred embodiment involves the provision of a cover system 10 on an aircraft supply vehicle 12. Vehicle 12 could be a generally conventional catering truck which includes a cab 14 shown in phantom in various figures with a body 16 located behind the cab. Body 16 would be mounted on any suitable elevating mechanism such as the scissor type hydraulic lift 18 shown in FIG. 8. Ordinarily, the body 16 would contain various supply contents which are intended to be moved into the aircraft. Such supply contents might, for example, include food items. The body 16 is elevatable so that it can be raised to the height of the hatch or door 20 of the aircraft 22 so that the body would be generally level with the opened doorway or hatch opening 24. In order to comply with height regulations, however, the body would be lowered to the position shown, for example, in FIGS. 1 and 7 so that the vehicle 12 is in a more compact condition while it is being driven. Body 16 may include a rear door (not shown) for loading the body and a door, such as the rolling door 26 at its front end near the cab 14.

With conventional supply vehicles, such as catering trucks, the vehicle would be driven close to the aircraft and a worker would enter the body of the aircraft to remove the various contents. In such conventional practice the worker would be exposed to the elements while traveling to and from the aircraft and the vehicle body. Under severe weather conditions, such as rain, snow or high temperatures it would be desirable to provide some form of shelter for the worker so that the worker could freely move from the body and aircraft without being exposed to the elements. It would also be desirable to shelter the interior of the aircraft from outside conditions when the door 20 is opened. Thus, for example, locations near the door including passenger seats would not be exposed to outside conditions. The shelter would also be advantageous to minimize the escape of heat or of cooled air conditioned air from the aircraft interior when the door is opened.

In accordance with this invention an entrance station 28 is located above the cab 14 of the vehicle. Entrance station 28 includes a floor which may be in one or more sections 30,32. A side wall 34,34 is mounted above the floor 30,32. Preferably, one portion of the side wall is in the form of a swingable gate 36. A ladder 38 may be provided so that a worker could enter the entrance station 28 by climbing the ladder 38 and then opening the gate 36 to gain access to the entrance station 28.

As illustrated in the various figures the floor of entrance station 28 has a resilient bumper 40 located at its lead edge made of any suitable material such as foam rubber. Thus, bumper 40 could press against the aircraft to help form a sheltered tunnel or enclosure.

Figure 8:
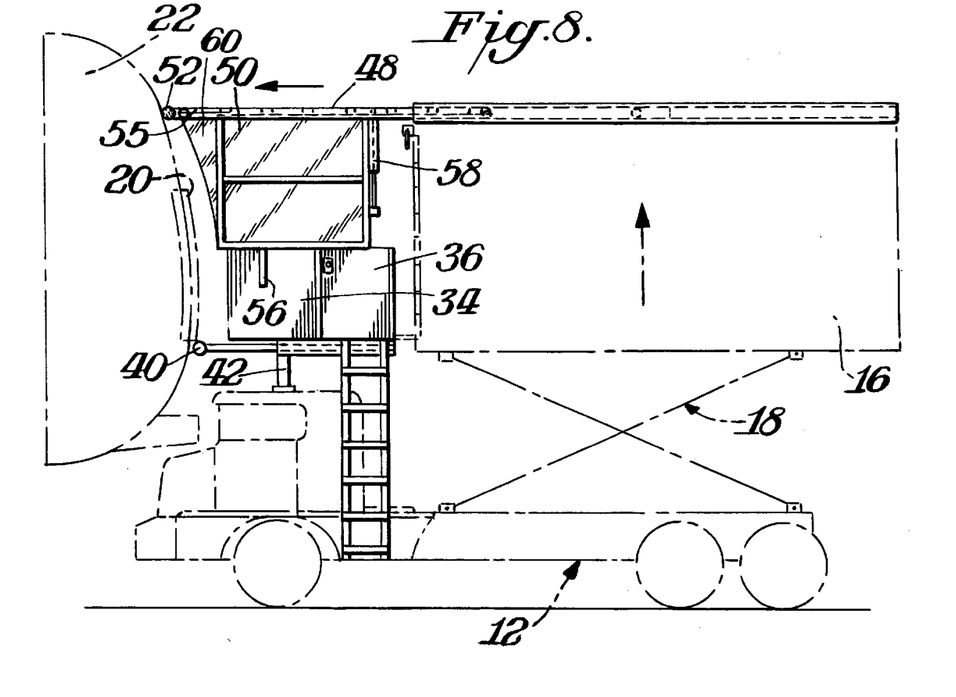
FIG. 8 is a left side elevational view showing the cover system in its sheltered condition similar to FIG. 6.

The floor of entrance station 28 may rest directly on the cab 14 or as shown in FIG. 8 may be supported by one or more support posts 42.

Figure 3:
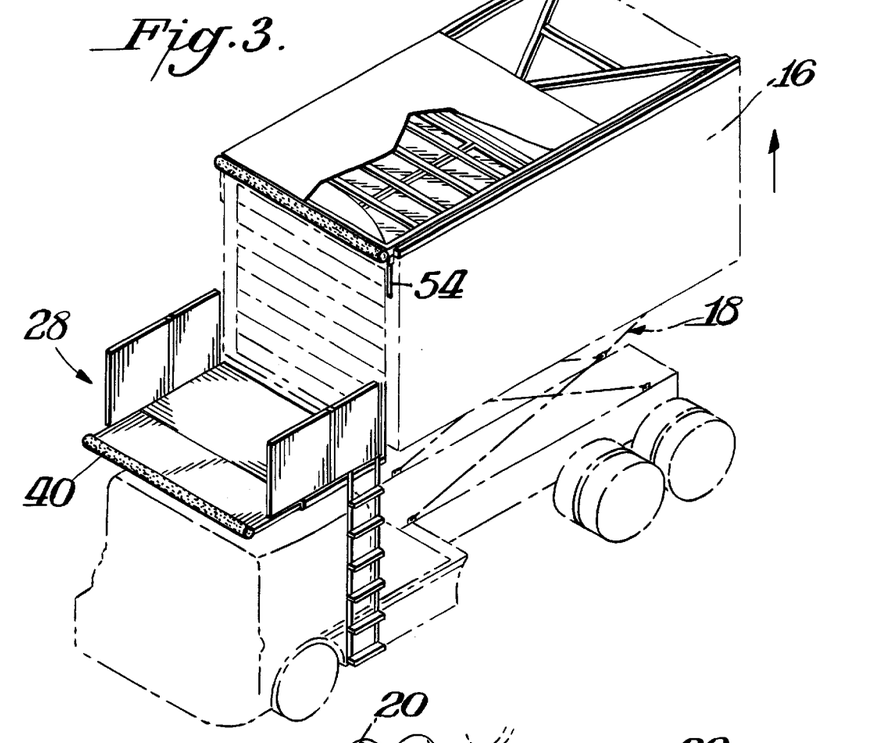
FIG. 3 is a perspective view showing the vehicle with the vehicle bed in the elevated condition.
Figure 4:
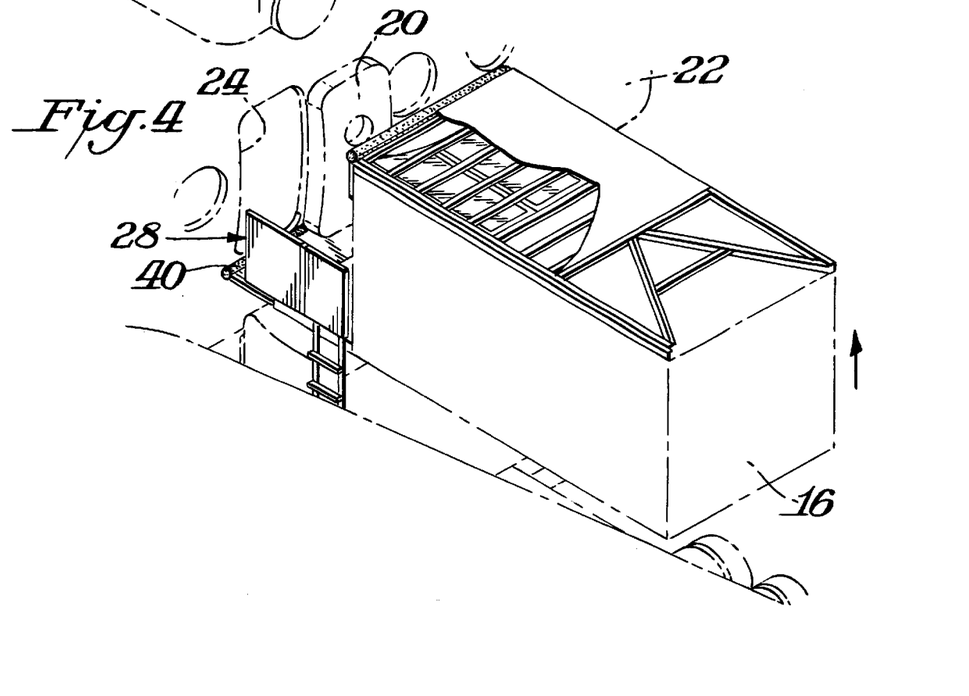
FIG. 4 is a perspective view similar to FIG. 3 showing the vehicle located adjacent to the aircraft.
Figure 5:
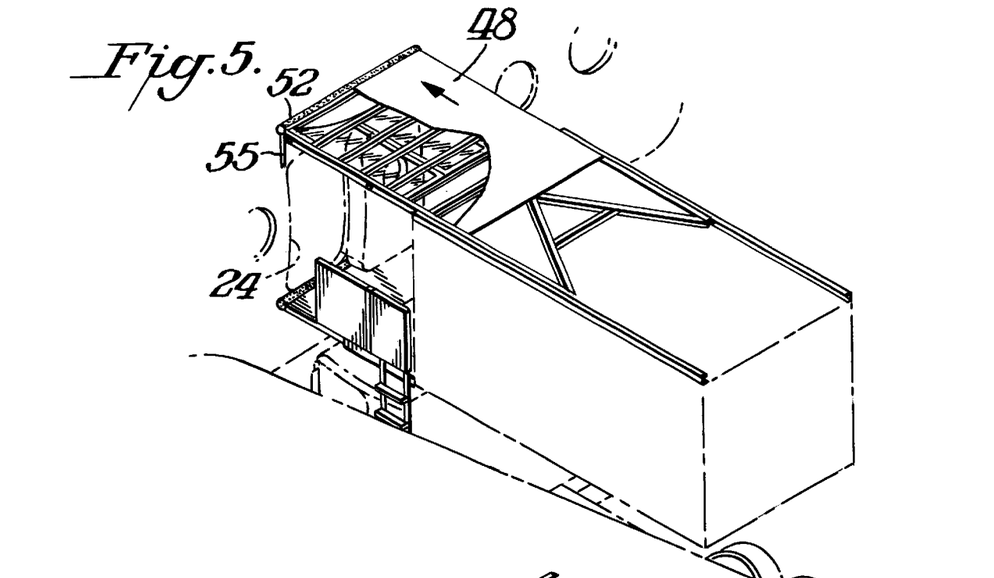
FIG. 5 is a perspective view similar to FIG. 4 showing the cover system extended before the shelter or tunnel is created.
Figure 6:
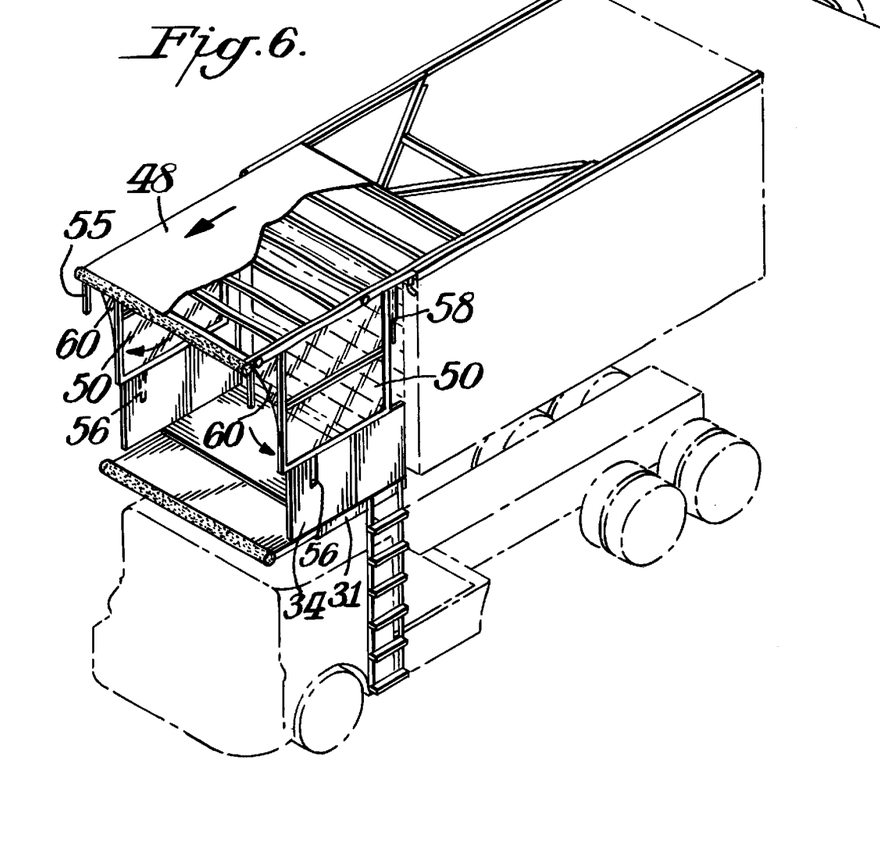
FIG. 6 is a view similar to FIG. 5 showing the cover system in a condition where the wings are lowered and a shelter is formed.

In one embodiment of this invention shown in FIGS. 1–8, cover system 10 includes a frame 44 slidably mounted in a track 46 on top of body 16. A cover is secured to frame 44. The cover includes a central roof section 48 and depending wings 50,50. See FIG. 6. While in the stored condition on the top of body 16 the wings 50,50 are folded underneath the roof section 48 on top of frame 44. The lead end of roof section 48 includes a resilient bumper 52 similar to bumper 40 for pressing against the aircraft when the cover system is in its extended condition such as shown in FIGS. 5, 6 and 8. Each wing 50 may be formed from one or more individual panels as illustrated in FIGS. 6 and 8.

Figure 1:
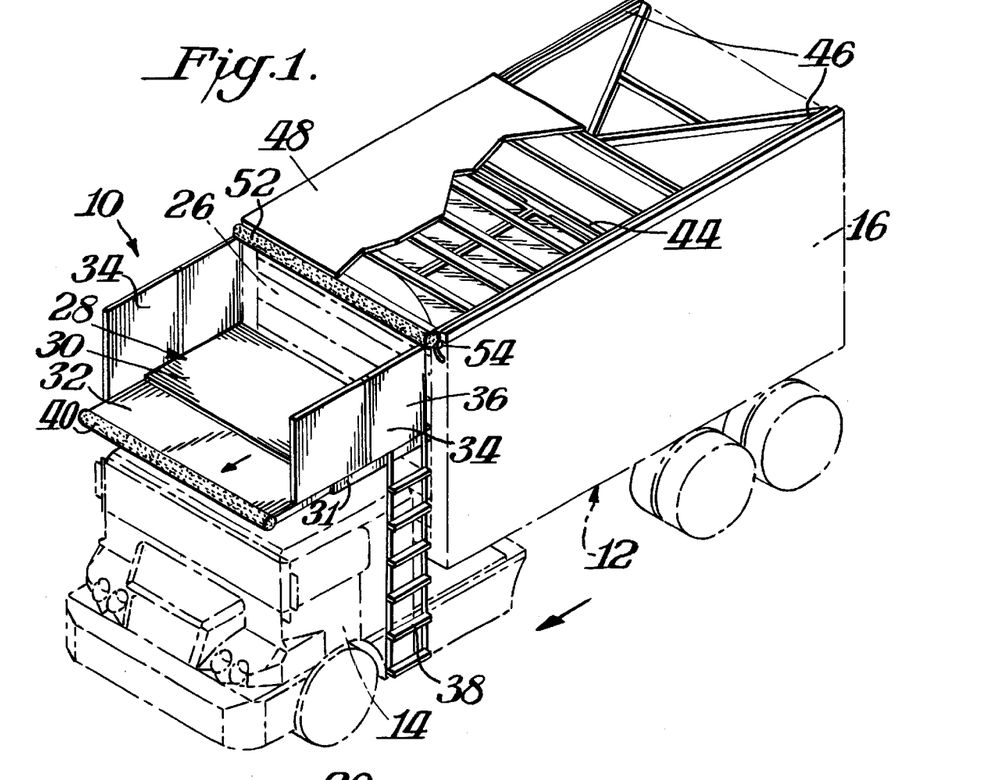
FIG. 1 is a perspective view of an aircraft supply vehicle in accordance with this invention in its condition as the vehicle is moving toward the aircraft.
Figure 2:
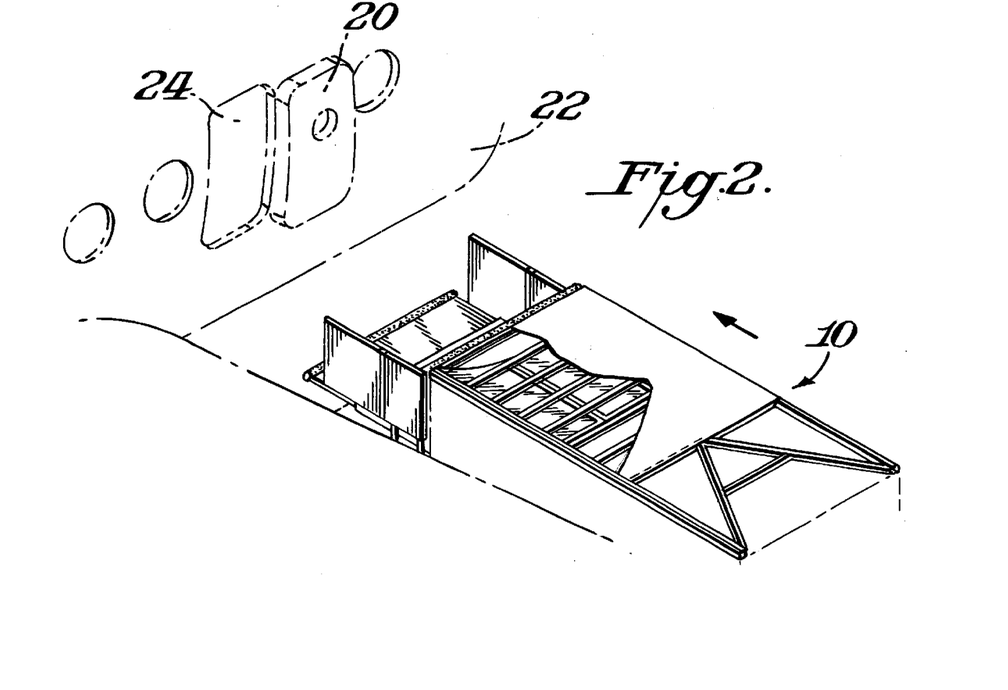
FIG. 2 is a perspective view from the rear of the vehicle showing the vehicle as it approaches the aircraft.
Figure 7:
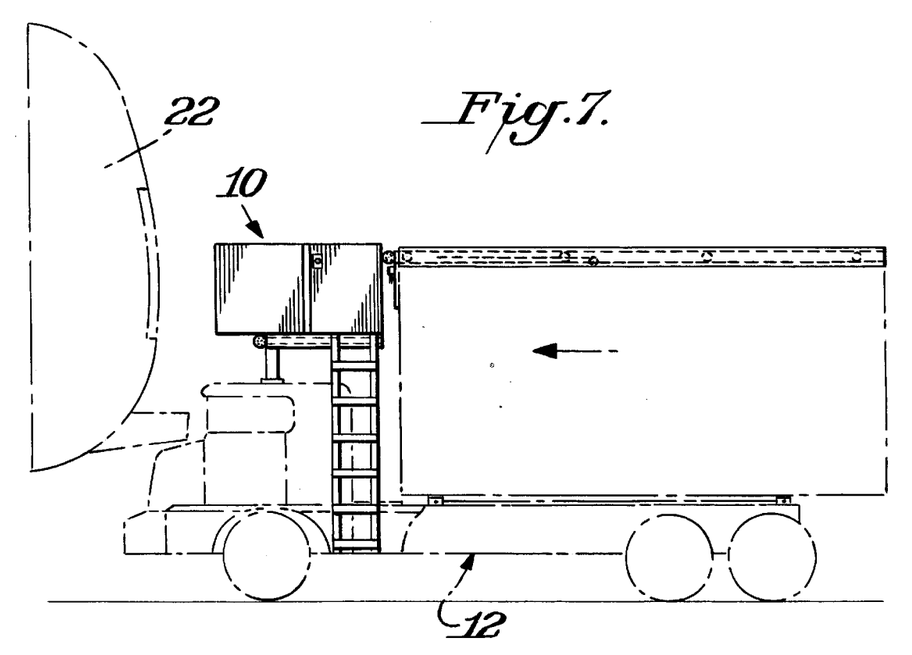
FIG. 7 is a left side elevational view showing the vehicle moving toward the aircraft similar to FIG. 1.

In operation vehicle 12 would be driven toward the aircraft as shown in FIGS. 1, 2 and 7. While making the approach to the aircraft the body 16 would be in its lowered condition so that the overall size of the vehicle could conform with height and width size requirements and to facilitate the driving of the vehicle.

When the vehicle is located with the cab 14 adjacent to the aircraft 22 as shown in FIG. 4 the vehicle is then in a condition for the next stage of operation. At this stage the entrance station 28 is located juxtaposed the aircraft with the bumper 40 pressing against the aircraft wall. If necessary, as later described, floor section 32 could be moved in or out to properly position the bumper 40 against the aircraft wall. Door 20 of the aircraft is opened to expose the doorway 24 to the entrance station 28. A partial enclosure is formed by side walls 34,34.

The body 16 is then elevated as shown in FIG. 3 until the floor of the body is generally level with the floor 30,32 of the entrance station and with the bottom of doorway 24.

Any suitable locking mechanism, such as lock handle 54, is released to allow the frame 44 and the cover to slide forwardly over the entrance station as shown in FIG. 5. After the frame 44 has been fully extended, lock handle 54 maybe re-activated to lock frame 44 in its extended condition. Handles 55 may be used to facilitate the pulling or sliding of the system toward the aircraft. The pulling is continued until the bumper 52 presses against the aircraft 22 as shown in FIG. 5. As shown in FIG. 8 handle 55 could be moved, such as by a hinged or pivotal mounting which could be spring biased, to an inactive position so as to avoid handle 55 contacting the plane once the frame has been sufficiently extended. Thus, FIG. 8 shows the handle 55 to be in a horizontal inactive condition, as contrasted to FIGS. 5–6 which shows the handle 55 to be vertical when in its use condition. With the lock handle 54 again activated, the frame 44 is prevented from any forward or backward sliding movement as might, for example, otherwise result from, wind or other conditions. The system is now ready for the next step of operation.

Next, by using pull straps 56 the wings 50 are lowered. A piston 58 is preferably provided for each wing to control the downward movement and urge the wings downwardly tight against the top of side walls 34 and gate 36. Wings 50 are preferably made of a clear plastic material to ensure that weather can not enter the aircraft's entrance 24, as well as keeping the operator or workers dry.

One end of the piston 58 is mounted to the frame 44 while the other end is mounted to the wing 50. Frame 44 functions not only to provide the sliding action within the track for the cover system, but also supports the wings 50 when the wings are in their stored condition. When the wings are pulled outwardly and downwardly the resistance from the pistons 58 prevents the wings from falling too rapidly thereby slowing the downward movement of the wings until the wings are pressed against the upper surface of the side walls 34,34.

Wings 50 may be formed where the individual sections are secured below the roof section 48 and/or on the frame 44 to roll outwardly and downwardly segment by segment toward the side walls 34. The piston 58 could be secured to the lowermost segment for urging that segment toward and against the upper edge of side wall 34 thereby assuring that the proper number of segments has been lowered to create the closed tunnel.

After extending the wings a sufficient amount the wings can be locked to the side walls in any suitable manner to keep the system stationary.

The roof section 48 may be formed of a plastic material in joined sections which may be rigid or may be flexible. The roof could be a flexible tarpaulin rigidly secured to the frame 44. The wings are preferably made of a material having some stiffness to create a stable enclosure. Flexible material, however, may be used for the wings, including a tarpaulin. Alternatively, the wings may be similar to curtains which roll up or down similar to window shades. What is intended is that the wings and roof, whether completely or partially flexible or rigid, could be stored in a compact condition in any suitable location and then extended to cover the entrance station 28. Preferably, the covering results in cooperation with the entrance way structure to create a tunnel or complete sheltered walkway for the operator or workers.

When the cover system has been placed in its final retracted covering position, such as shown in FIGS. 6 and 8, a worker could climb the ladder 38 and enter the entrance station 28 through gate 36. The roll down door 26 of the vehicle body would then be opened and there would be direct access through the resulting sheltered walkway to and from the vehicle body and aircraft.

One of the advantageous features of the invention is that the cover system and entrance station are confined within the width of the vehicle so as not to impede driving and so as to comply with government width and height requirements. While the preferred practice of the invention provides having the cover system slidably mounted above the body during its retracted condition, the covering system could be stored in other manners such as being vertically stored against the upper portion of doorway 26 and/or horizontally on the floor of entrance way 28. Alternatively, the cover system could be stored within the body below the roof of the body and then withdrawn from the body.

The front section 32 of the entrance station floor could be extendable/retractable to accommodate different types of aircraft. Similarly, the walls 34 could be correspondingly extendable/retractable. The floor section and walls could also twist from side to side if necessary to accommodate a particular aircraft. As shown in the various figures the outer section or platform 32 telescopes into a support track 31 which depends from the inner floor section 30.

The outermost ends of the wings 50 may include flexible extensions 60 made of rubber or other suitable material to conform to the curvature of the aircraft. See FIGS. 6 and 8.

Although the invention is preferably practiced by having a ladder 38 leading to the gate 36, other devices could be used such as a completely separate wheeled platform which would be moved toward the gate 36. Similarly, although not as preferred, the gate 36 could be completely omitted and the door at the rear of the body could be used for the worker to enter the body and then open the roll up door 26 to gain access to the entrance station 28.

When the supplying operation has been completed the reverse steps are taken. Wings 50 are unlocked from side walls 34. Where, for example, the locking was by securing the handles 56 to some anchor structure on side walls 34, the handles 56 are then released. Piston 58 on each side of the cover system is actuated to retract the piston and thereby raise the wing sections back to their stored condition below roof section 48 and above frame 44. Lock handle 54 is unlocked. The wings and roof section are then pushed back over the truck body through the use of handles 55, if desired, until the cover system has been completely retracted. Lock handle 54 is again actuated to lock the cover system in its retracted condition. Body 16 is then lowered and the vehicle is in the condition shown in FIGS. 1 and 2 where it may again be driven away from the aircraft. Hatch door 20 closes doorway 24.

The invention may be practiced with other variations. For example, while the embodiment of FIGS. 1–8 shows the wings 50 being lowered until the wings contact the top of the side walls 34 the wings 50 could extend along side of and below the side walls, such as illustrated in the later described embodiment of FIGS. 9–10. Alternatively, the side walls and gate could be completely omitted and the wings could extend to the floor 30,32. If desired, in such alternative the bottom of the wings may be weighted, particularly where a window shade type wing structure is used, to hold the bottom against the floor 30,32. Additionally, if desired, fastening devices such as clamps or other locking devices could be used to hold the bottom of the wings against the floor.

The wings and/or roof and/or side walls can be made of a transparent material to permit visibility through the shelter. Alternatively, opaque or translucent materials may be used.

Figures 9, 10:
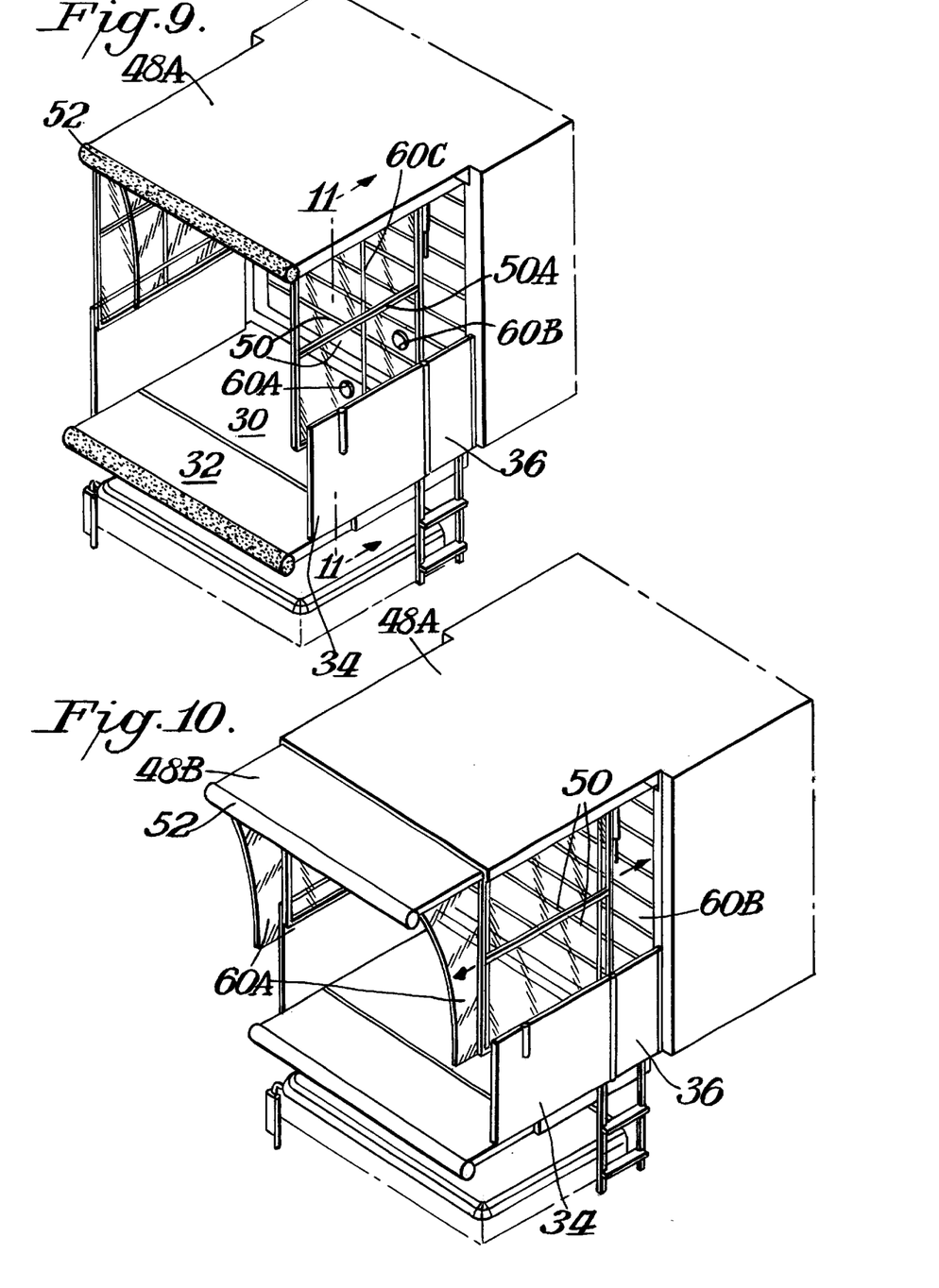
FIG. 9 is a perspective view of a modified form of cover system in accordance with this invention.
FIG. 10 is a view similar to FIG. 9 in a different phase of operation.
Figure 11:
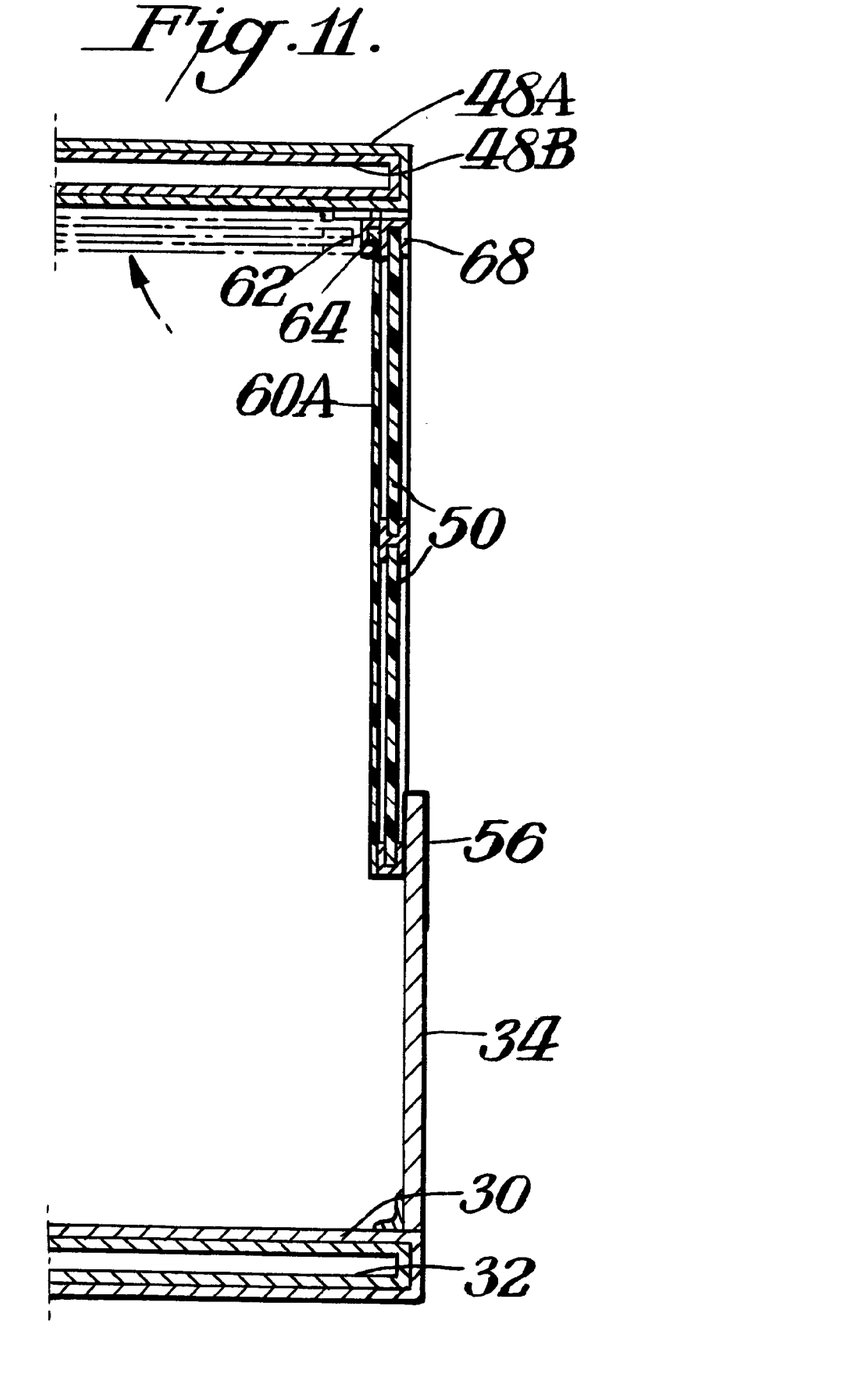
FIG. 11 is a cross-sectional view taken through FIG. 9 along the line 11—11.

FIGS. 9–11 illustrate an alternative practice of the invention wherein the roof section 48A is fixedly or permanently mounted in an extended condition over the floor 30,32. This could be done by making the roof section an integral extension of the body roof or by simply permanently fastening the roof section to the body roof. Roof section 48A may take the various forms previously described for the roof section 48.

FIG. 10 shows the embodiment of FIG. 9 wherein the permanently mounted roof section 48A includes a telescopic extension 48B to permit the more precise positioning of the bumper 52 against the side of the aircraft. Alternatively, roof section may have no extension and simply terminate in bumper 52 where a bumper is desired.

As previously noted, FIGS. 9–10 differ from the other illustrated embodiments in that the wings 50 extend below the upper edge of side wall 34 and gate 36.

Reference is also made to FIG. 11 which shows strap 56 for the wings 50 to be draped over the side wall 34 in the operative condition of the shelter.

FIGS. 9–10 also include features not illustrated in the prior embodiments of FIGS. 1–8 with regard to the ability to extend the lateral dimension of wings 50. This is accomplished by having two end extensions 60A, 60B on at least one of the wings where the wing is provided for the sidewall 34 having the gate 36. Extension 60A is similar to extension 60 in that it permits the wing to make better contact with the side of the aircraft. Extension 60B is provided so as to selectively permit an open space directly above gate 36. Thus, for example, if it should be desired to enter or leave the shelter through gate 36 when the shelter is in its extended and operative condition, extension 60B could be moved to a side by side condition with the main portions of wing 50 thereby leaving the area above gate 36 completely open as shown in FIG. 9. In the completely sheltered condition the extension 60B would be slid to the right of wing 50 as shown in FIG. 10 so as to again cover the otherwise open area above gate 36.

Where the entrance station includes only a single gate 36 it is not necessary to provide the wing 50 or the other side wall with the extensions 60B. Alternatively, each side wall may be provided with a gate and correspondingly, each wing would be provided with an extension 60B.

The movement of extensions 60A,60B could be accomplished in any suitable manner. FIG. 11 shows the inclusion of a track 62 suspended from roof section 48A. Track 62 accommodates a guide rail 64 at the top of extension 60A. A similar guide rail would be provided for extension 60B. Thus, the extensions 60A and 60B could slide in the track 62 and thereby be disposed at various lateral locations along side of wing 50. FIG. 11 also illustrates the wing assembly which includes the wing sections and extensions 50,60A, 60B to be mounted by a hinge 66 so that the frame 68 for wing 50 could thereby be pivoted upwardly as shown in phantom in FIG. 11.

When the wings and their extensions are pivoted to their inactive condition, such as against the underside of roof section 48A, any suitable locking mechanism may be used to hold the wings and their extensions in this inactive condition. For example, the two sets of wings one for each side of the shelter may be dimensioned so that their ends either overlap or are sufficiently close to each other in the stored inactive condition that the ends can be secured together by straps or other fasteners thereby holding the wings in the inactive condition.

FIG. 9 shows the wings 50,50 to be disposed in front or outwardly of extensions 60A and 60B before the extensions are moved to their extended positions. As shown in FIG. 9 the vertical edges 60C of the extensions 60A and 60B abut against each other since both extensions ride in the same track 62. The invention, however, may be practiced where the edges 60C are spaced from each other or where a double track is used so that each extension 60A and/or 60B may be of a size to overlap the other extension. FIG. 9 further shows the wing segments 50,50 to abut against each other at their edges 50A. FIG. 10 illustrates the extension 60A and 60B to be moved to their operative conditions where the lead edge of extension 60A would be positioned for abutting against the aircraft body and where the extension 60B would be disposed for covering the otherwise open space above gate 36.

It is to be understood that while specific features have been shown with regard to individual embodiments of this invention each of the embodiments may incorporate features shown and described with respect to other embodiments.

It is also to be understood that while the various figures illustrate relative positioning of different components of the system, alternative positioning could be used. Thus, for example, while the drawings illustrate the wings to be folded under the roof section during conditions of non-use it is also possible to store the wings above the roof section. Similarly, while it is preferred in the embodiment of a slidable roof section to have the roof section in its inactive condition mounted horizontally above the vehicle body, the roof section and wings could be stored along one side of the vehicle body in a vertical condition or in front of the rolling door 26 in a vertical condition or could lay flat on the floor 30,32 and then raised and moved to their operative condition. It is also to be understood that while in the preferred practice of the invention the wing sections lie directly against the roof section in the inactive condition. It is not necessary that the wings actually contact the roof section or each other. Thus the roof section and wings might be considered generally disposed against each other in the inactive condition even when stored in a sagging condition. Although not as preferred, the shelter could also omit the floor section and utilize the roof of the cab as its floor with or without a bumper such as bumper 40.

Although the extensions such as wing extensions 60A and 60B and roof extension 48B have been shown as slidable members one or more of these extensions could simply be flexible flaps which could be moved outwardly to extend the respective wing or roof section until the flap comes in contact with the aircraft body. Similarly, while the extension 60A is shown as having a curved forward or lead edge, such curved edge could be formed as the result of the flexibility of a flap being disposed against the aircraft body so that the curvature is formed by folding the flap against the aircraft body so as to accommodate the curvature of the aircraft body.

Although the invention is preferably manually operated some or all of the movements could be motor operated. Thus, for example, by actuation of a motor the cover system could be extended outwardly until the bumper 52 contacts the aircraft. Then, automatically or by further actuation by a motor the wings could be lowered into contact with the side walls. The same reverse actions could be taken when it is desired to return the cover system to its stored condition.

What is claimed is:

1. A sheltered aircraft supply vehicle having a body for housing supplies for an aircraft, a cab located forwardly of said body, said body being elevatable, said cab having a top, a door in said body located at said top of said cab when said body is elevated, an entrance station above said cab adapted to be located adjacent to a doorway of the aircraft, said door in said body leading to said entrance station, a cover system selectively above said cab whereby said entrance station is sheltered when said body is elevated, said cover system comprising a cover having a central roof section and a wing extending laterally on each side of said roof section, said cover system selectively having an inactive condition and an active condition, said roof section and said wings being generally disposed against each other when said cover system is in said inactive condition, and said roof section being above said cab with said wings extending downwardly toward said cab when said body is elevated and said cover system in said active condition.

2. The vehicle of claim 1 wherein said wings are folded under said roof section in said inactive condition.

3. The vehicle of claim 1 wherein said entrance station and said cover system are of a width confined within the width of said vehicle in said inactive condition.

4. The vehicle of claim 1 wherein said entrance station has a pair of side walls located forwardly of said body, and said wings extending to at least the top of said side walls when said cover system is in said active condition to create a tunnel at said entrance station.

5. The vehicle of claim 4 including an openable gate located in one of said side walls to provide access to said entrance station.

6. The vehicle of claim 5 wherein said body has an elevated condition and a non-elevated condition, a ladder located along said cab leading to said gate, and said sidewalls extending to generally the height of said body when said body is in said non-elevated condition.

7. The vehicle of claim 5 wherein a first extension is provided for one of said wings for selectively being disposed in a first position along side one of said wings to create an open space above said gate and disposed in a second position above said gate to close said open space.

8. The vehicle of claim 7 wherein each of said wings includes a second extension having a curved lead end for contacting the aircraft.

9. The vehicle of claim 4 wherein a flexible curved extension is provided at the lead end of each of said wings for contacting and generally conforming in shape to the aircraft.

10. The vehicle of claim 4 wherein said entrance station includes a floor, a first flexible bumper being mounted to the lead edge of said floor of said entrance station, and a second flexible bumper being mounted to the lead edge of said roof section.

11. The vehicle of claim 10 wherein said floor of said entrance station and said side walls are laterally extendable and laterally retractable.

12. The vehicle of claim 1 wherein in said inactive condition of said roof section is a location above said body, and said roof section being slidably mounted for movement from an inactive position above body to an active position above said entrance station.

13. The vehicle of claim 1 including pull straps on each of said wings, a pull handle at the lead end of said roof section, and a lock handle mounted to said body for locking said cover system to said body.

14. The vehicle of claim 1 wherein said cover system is stored above said body when in said inactive condition.

15. The vehicle of claim 1 wherein said roof section is mounted over said entrance station when said cover system is in both said inactive condition and said active condition, and said wings are movable to and between an active position when said cover system is in said active condition and an inactive position when said cover system is in said inactive condition.

16. The vehicle of claim 15 wherein said roof section includes a forward section to extend the length of said roof section for accommodating the aircraft.

17. The vehicle of claim 1 said entrance station has a floor, wherein a first flexible bumper being mounted to the lead edge of said floor of said entrance station, and a second flexible bumper is mounted to the lead edge of said roof section.

18. A sheltered aircraft supply vehicle a body for housing supplies for an aircraft, a cab located forwardly of said body, said cab having a top, a door in said body located at said top of said cab, an entrance station above said cab adapted to be located adjacent to a doorway of the aircraft, said door of said body leading to said entrance station, said entrance station having a pair of side walls located outwardly of said body, said body being elevatable with a portion of said body elevatable above said side walls, a cover system selectively above said side walls whereby said entrance station is sheltered when said body is elevated, said cover system comprising a cover having a central roof section and a wing extending laterally on each side of said roof section, said cover system selectively having a retracted condition and an extended condition, said roof section and said wings being dis-posed generally against each other and located at said body when said cover system is in said retracted condition, said roof section being above said side walls with said wings extending downwardly toward said sidewalls when said body is elevated and said cover system in said extended condition, said entrance station and said cover system being of a width confined within the width of said vehicle, a gate located in one of said side-walls to provide access to said entrance station, said wings extending into contact with said side walls to create a closed tunnel, a flexible curved extension being provided at the lead end of each of said wings for contacting the aircraft, said entrance station having a floor, a first flexible bumper being mounted to the lead edge of the floor of said entrance station, and a second flexible bumper being mounted to the lead edge of said roof section.

19. The vehicle of claim 18 wherein one of said wings includes a second extension for being selectively disposed in a first position which creates an open space above said gate and in a second position directly above and covering said open space.

20. A sheltered aircraft supply vehicle having a body for housing supplies for an aircraft, a cab located forwardly of said body, said cab having a top, a door in said body located at said top of said cab, an entrance station above said cab adapted to be located adjacent to a doorway of the aircraft, said door of said body leading to said entrance station, said entrance station having a pair of side walls located forwardly of said body, said sidewalls having a top, said body being elevatable with a portion of said body elevatable above said side walls, a cover system above said side walls whereby said entrance station is sheltered when said body is elevated, said cover system comprising a cover having a central roof section and a wing extending laterally on each side of said roof section, said wings selectively having an inactive condition and an active condition, said roof section being mounted forwardly of said body above said cab in both said active and said inactive conditions of said wings, said roof section and said wings being generally disposed against each other when said wings are in said inactive condition, and said wings extending downwardly toward said side walls to about said top of said side walls when said body is elevated and said wings are in said active condition.

* * * * *